(12) United States Patent
Lee et al.

(10) Patent No.: US 11,135,550 B2
(45) Date of Patent: Oct. 5, 2021

(54) PROCESS DISCHARGE GAS POLLUTED MATERIAL REMOVAL DEVICE WITH REGENERATING MEANS OF POLLUTED OXIDATION CATALYST

(71) Applicant: KOREA INSTITUTE OF MACHINERY & MATERIALS, Daejeon (KR)

(72) Inventors: Dae-hoon Lee, Daejeon (KR); Younghoon Song, Daejeon (KR); Kwan-Tae Kim, Daejeon (KR); Sungkwon Jo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 707 days.

(21) Appl. No.: 15/773,636

(22) PCT Filed: Nov. 1, 2016

(86) PCT No.: PCT/KR2016/012478
§ 371 (c)(1),
(2) Date: May 4, 2018

(87) PCT Pub. No.: WO2017/078377
PCT Pub. Date: May 11, 2017

(65) Prior Publication Data
US 2018/0318761 A1    Nov. 8, 2018

(30) Foreign Application Priority Data

Nov. 5, 2015 (KR) .......... 10-2015-0155255
Apr. 5, 2016 (KR) .......... 10-2016-0041684

(51) Int. Cl.
| | | |
|---|---|---|
| *B01D 53/86* | (2006.01) |
| *B01D 53/56* | (2006.01) |
| *B01D 53/62* | (2006.01) |
| *B01D 53/96* | (2006.01) |
| *B01J 38/10* | (2006.01) |
| *B01D 53/32* | (2006.01) |
| *C01B 3/02* | (2006.01) |
| *B01J 38/04* | (2006.01) |
| *C01B 13/10* | (2006.01) |
| *C01B 3/36* | (2006.01) |
| *C01B 3/38* | (2006.01) |

(52) U.S. Cl.
CPC ......... *B01D 53/8628* (2013.01); *B01D 53/32* (2013.01); *B01D 53/56* (2013.01); *B01D 53/62* (2013.01); *B01D 53/864* (2013.01); *B01D 53/8625* (2013.01); *B01D 53/96* (2013.01); *B01J 38/04* (2013.01); *B01J 38/10* (2013.01); *C01B 3/02* (2013.01); *C01B 3/36* (2013.01); *C01B 3/38* (2013.01); *C01B 13/10* (2013.01); *B01D 2256/20* (2013.01); *B01D 2256/22* (2013.01); *B01D 2257/402* (2013.01); *B01D 2257/404* (2013.01); *B01D 2259/818* (2013.01); *C01B 2203/025* (2013.01); *C01B 2203/0465* (2013.01); *C01B 2203/0861* (2013.01); *Y02P 20/584* (2015.11)

(58) Field of Classification Search
CPC .. B01D 53/8628; B01D 53/96; B01D 53/927; B01D 53/9418; B01D 53/9431; B01J 38/10
USPC .......................................................... 502/26
See application file for complete search history.

(56) References Cited

U.S. PATENT DOCUMENTS

| | | | |
|---|---|---|---|
| 2007/0012028 A1 | 1/2007 | Weissman | |
| 2010/0193921 A1* | 8/2010 | Jereza | H01L 23/49575 |
| | | | 257/676 |

FOREIGN PATENT DOCUMENTS

| | | | | |
|---|---|---|---|---|
| CN | 1791736 | | 6/2006 | |
| CN | 101678272 | | 3/2010 | |
| CN | 102400744 | | 4/2012 | |
| CN | 102989484 | | 3/2013 | |
| JP | 2005-002968 | | 1/2005 | |
| JP | 2005002968 A | * | 1/2005 | ............ F01N 3/106 |
| JP | 2008-175136 | | 7/2008 | |
| JP | 2008175136 A | * | 7/2008 | |
| KR | 10-2010-0092751 | | 8/2010 | |
| KR | 20100092751 A | * | 8/2010 | |
| KR | 10-1144699 | | 7/2012 | |

* cited by examiner

Primary Examiner — Yong L Chu
(74) Attorney, Agent, or Firm — Lex IP Meister, PLLC

(57) ABSTRACT

A process discharge gas polluted material removal device with a regenerating means of a polluted oxidation catalyst includes: an oxidation catalyst tower connected to a pipe circulating a process discharge gas including a combustible material, an organic material, an inorganic material, and nitrogen oxide and having a first temperature and having an oxidation catalyst embedded therein, the oxidation catalyst oxidizing and removing the combustible material; and a plasma reactor connected to the oxidation catalyst tower in front of the oxidation catalyst, generating a synthesis gas including hydrogen and having a high temperature of 300° C. or more by a plasma reaction, and supplying the synthesis gas including the hydrogen to the oxidation catalyst to regenerate the oxidation catalyst poisoned by the organic material and the inorganic material.

24 Claims, 15 Drawing Sheets

PROCESS DISCHARGE GAS POLLUTED MATERIAL REMOVAL DEVICE WITH REGENERATING MEANS OF POLLUTED OXIDATION CATALYST

TECHNICAL FIELD

The present invention relates to a process discharge gas polluted material removal device with a regenerating means of an oxidation catalyst polluted due to removal of a process discharge gas polluted material.

BACKGROUND ART

An oxidation catalyst is used to remove combustible polluted materials such as CO and HC generated and discharged at industrial sites, and a selective catalytic reduction (SCR) is used to remove nitrogen oxide (NOx). That is, Co and HC included in a process discharge gas may be oxidized through the oxidation catalyst, and NOx may be reduced through the SCR.

However, an oxidation catalyst may be rapidly poisoned by very small amounts of organic material and inorganic material included in the process discharge gas depending on a kind of process. In addition, the SCR should be maintained at a startup temperature of 230° C. or more in order to remove NOx.

In the case in which a temperature of the process discharge gas depending on a process is low, the temperature of the process discharge gas is increased by heating the process discharge gas, and the SCR may thus remove NOx.

When the poisoned oxidation catalyst is regenerated in a high temperature condition, the organic material is oxidized and removed from the oxidation catalyst, such that reactivity of the oxidation catalyst may be recovered. However, in the case of the inorganic material, reactivity of the oxidation catalyst is not recovered only by simply processing the oxidation catalyst at a high temperature.

For example, oxidation conversion rates of CO and HC by the oxidation catalyst is maintained at a first level in a first high temperature condition in a state in which the oxidation catalyst is not poisoned, and is rapidly decreased to a second level lower than the first level when the oxidation catalyst is poisoned by the inorganic material.

In the case of regenerating the oxidation catalyst only by simply processing the oxidation catalyst at the high temperature in this state, even though the first high temperature condition is again provided, the oxidation conversion rates are not recovered to the first level, but shows performance lower than the first level due to the poisoning of the oxidation catalyst by the inorganic material.

Therefore, in the case in which the inorganic materials may not be removed on the oxidation catalyst, activity of the oxidation catalyst is decreased due to the inorganic materials remaining on the oxidation catalyst.

DISCLOSURE

Technical Problem

The present invention has been made in an effort to provide a process discharge gas polluted material removal device with a regenerating means of a polluted oxidation catalyst having advantages of effectively regenerating an oxidation catalyst polluted by a process discharge gas including a combustible material, an organic material, an inorganic material, and XOx.

Technical Solution

An exemplary embodiment of the present invention provides a process discharge gas polluted material removal device with a regenerating means of a polluted oxidation catalyst, including: an oxidation catalyst tower connected to a pipe circulating a process discharge gas including a combustible material, an organic material, an inorganic material, and nitrogen oxide and having a first temperature and having an oxidation catalyst embedded therein, the oxidation catalyst oxidizing and removing the combustible material; and a plasma reactor connected to the oxidation catalyst tower in front of the oxidation catalyst, generating a synthesis gas including hydrogen and having a high temperature of 300° C. or more by a plasma reaction, and supplying the synthesis gas including the hydrogen to the oxidation catalyst to regenerate the oxidation catalyst poisoned by the organic material and the inorganic material.

The process discharge gas polluted material removal device with a regenerating means of a polluted oxidation catalyst may further include a reduction catalyst tower connected to the oxidation catalyst tower and having a selective catalytic reduction embedded therein, the selective catalytic reduction removing the nitrogen oxide included in a process discharge gas having a second temperature higher than the first temperature.

The process discharge gas polluted material removal device with a regenerating means of a polluted oxidation catalyst may further include a first control valve performing a selection so as to allow the process discharge gas having the first temperature to be supplied from the pipe to the oxidation catalyst or allow the process discharge gas having the first temperature to bypass the oxidation catalyst and be supplied to the reduction catalyst tower.

The selective catalytic reduction may be heated to a startup temperature by the process discharge gas passing through the oxidation catalyst and having the second temperature.

The plasma reactor may include: a housing including a fuel supply port and an air supply port disposed at one side thereof, including a discharge port disposed at the other side thereof, and grounded, the discharge port discharging the synthesis gas including the hydrogen; and an electrode provided between the fuel supply port and the air supply port and having a voltage applied thereto.

The housing may include a plasma reaction space extended between a front of the electrode and the discharge port.

The plasma reactor may further include a reforming catalyst communicating with a plasma reaction space formed between the fuel supply port and the air supply port, and the discharge port of the housing.

The plasma reactor may include a fuel additional supply port and an air additional supply port provided between the plasma reaction space of the housing and the reforming catalyst to additionally supply a fuel and air.

The process discharge gas polluted material removal device with a regenerating means of a polluted oxidation catalyst may further include a bypass pipe connecting the first control valve to the oxidation catalyst tower so that the process discharge gas bypasses the oxidation catalyst.

The oxidation catalyst tower may include a first oxidation catalyst tower and a second oxidation catalyst tower disposed in parallel with each other and selectively connected to the selective catalytic reduction by a second control valve, and the first control valve may selectively connect the pipe to the first oxidation catalyst tower and the second oxidation catalyst tower in front of the oxidation catalyst.

The plasma reactor may be selectively connected to the first oxidation catalyst tower and the second oxidation catalyst tower through a third control valve.

The process discharge gas polluted material removal device with a regenerating means of a polluted oxidation catalyst may further include: a first control valve provided in front of the oxidation catalyst tower and intermitting the process discharge gas supplied to the oxidation catalyst tower and having the first temperature; and a second control valve provided behind the oxidation catalyst tower and intermitting the process discharge gas supplied to the oxidation catalyst tower and having the second temperature.

The plasma reactor may be installed on a bypass pipe connecting the first control valve and the second control valve to each other and generate a plasma reaction by the process discharge gas circulated through a closed loop formed by selection operations of the first control valve and the second control valve and having the first temperature and separately supplied air to generate the synthesis gas including the hydrogen and having the high temperature of 300° C. or more.

The process discharge gas polluted material removal device with a regenerating means of a polluted oxidation catalyst may further include an ozone generator connected to the oxidation catalyst tower in front of the oxidation catalyst and supplying ozone.

The process discharge gas polluted material removal device with a regenerating means of a polluted oxidation catalyst may further include a bypass pipe having one side connected to the oxidation catalyst tower behind the oxidation catalyst and the other side connected to the pipe through a first control valve so that the process discharge gas bypasses the oxidation catalyst.

The oxidation catalyst tower may include a first oxidation catalyst tower and a second oxidation catalyst tower disposed in parallel with each other and selectively connected to the selective catalytic reduction by a second control valve, and the first control valve may selectively connect the pipe to the first oxidation catalyst tower and the second oxidation catalyst tower in front of the oxidation catalyst.

A supply pipe connected to the plasma reactor and the ozone generator to selectively supply the hydrogen and the ozone may selectively connect the plasma reactor to the first oxidation catalyst tower and the second catalyst tower through a third control valve, and selectively connect the ozone generator to the first oxidation catalyst tower and the second oxidation catalyst tower through a fourth control valve.

The first oxidation catalyst and the second oxidation catalyst may be formed in one stage or plural stages within the first oxidation catalyst tower and the second oxidation catalyst tower, respectively.

Air supplied to the plasma reactor may be set to 10 to 100% of a combustion equivalent ratio.

The reduction catalyst tower may be provided behind the oxidation catalyst tower.

The first control valve may intermit the process discharge gas supplied from the pipe to the oxidation catalyst tower and having the first temperature, and the second control valve may intermit the process discharge gas supplied from the oxidation catalyst tower to the reduction catalyst tower and having the second temperature.

The reduction catalyst tower may be provided in front of the oxidation catalyst tower and be connected to the pipe, and a heat exchanger may be installed on the pipe and a rear pipe of the oxidation catalyst tower.

The first control valve may intermit the process discharge gas supplied from the reduction catalyst tower to the oxidation catalyst tower and having the first temperature, and the second control valve may intermit the process discharge gas supplied from the oxidation catalyst tower to the heat exchanger and having the second temperature.

Another exemplary embodiment of the present invention provides a process discharge gas polluted material removal method with a regenerating means of a polluted oxidation catalyst, including: a first step of blocking a process discharge gas to allow the process discharge gas to bypass a poisoned oxidation catalyst, in order to regenerate the poisoned oxidation catalyst; a second step of supplying hydrogen generated by driving a plasma reactor to the poisoned oxidation catalyst to remove an inorganic material of the poisoned oxidation catalyst; a third step of blocking the supply of the hydrogen by stopping an operation of the plasma reactor when a predetermined time elapses after the plasma reactor is driven; a fourth step of supplying ozone generated by driving an ozone generator to the poisoned oxidation catalyst to remove an organic material of the poisoned oxidation catalyst; and a fifth step of blocking the supply of the ozone by stopping an operation of the ozone generator, releasing the bypass of the process discharge gas for the poisoned oxidation catalyst, and introducing the process discharge gas into the poisoned oxidation catalyst, when a predetermined time elapses after the ozone generator is driven.

In the first step, the oxidation catalyst poisoned by the inorganic material may be regenerated in a condition in which a temperature of the process discharge gas is higher than a set value (350° C.).

The third step may be performed at a temperature of the process discharge gas higher than a set value to remove the inorganic material, and the fourth step may be performed at a temperature of the process discharge gas lower than the set value to oxidize and remove the organic material.

Advantageous Effects

The process discharge gas polluted material removal device with a regenerating means of a polluted oxidation catalyst according to an exemplary embodiment of the present invention may effectively regenerate an oxidation catalyst polluted from a combustible material, an organic material, an inorganic material, and NOx.

MODE FOR INVENTION

Figure 1:
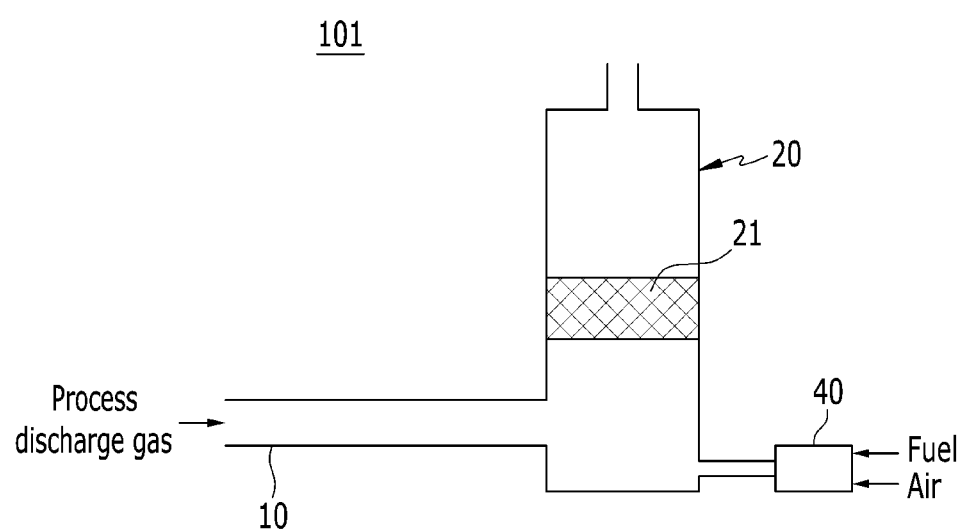
FIG. 1 is a configuration diagram illustrating a process discharge gas polluted material removal device with a regenerating means of a polluted oxidation catalyst according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Portions unrelated to the description will be omitted in order to obviously describe the present invention, and similar components will be denoted by the same or similar reference numerals throughout the present specification.

In addition, since sizes and thicknesses of the respective components illustrated in the drawings are arbitrarily illustrated for convenience of explanation, the present invention is not necessarily limited to those illustrated in the drawings.

In addition, throughout the present specification, unless explicitly described to the contrary, the word "comprise" and variations such as "comprises" or "comprising", will be understood to imply the inclusion of stated elements but not the exclusion of any other elements.

FIG. 1 is a configuration diagram illustrating a process discharge gas polluted material removal device with a regenerating means of a polluted oxidation catalyst according to a first exemplary embodiment of the present invention.

Referring to FIG. 1, a process discharge gas polluted material removal device 101 with a regenerating means of a polluted oxidation catalyst includes a pipe 10 circulating a process discharge gas, an oxidation catalyst tower 20 connected to the pipe 10 and having an oxidation catalyst 21 embedded therein, and a plasma reactor 40 generating a synthesis gas including hydrogen and having a high temperature.

The process discharge gas is generated and discharged in each process of industrial sites, and includes a polluted material such as a combustible material, an organic material, and an inorganic material together with discharge of NOx in the case in which a high-temperature process is included. For example, the combustible material includes CO and HC, and the inorganic material includes sulfur, a fluorine-based compound. The process discharge gas introduced into the pipe 10 in a production process is maintained at a first temperature level set depending on a process.

The oxidation catalyst 21 is embedded in the oxidation catalyst tower 20, and with respect to a flow of the process discharge gas, the combustible material included in the process discharge gas introduced into the front of the oxidation catalyst 21 is removed by an oxidation catalyst action, and the process discharge gas is then discharged to the rear of the oxidation catalyst 21

The oxidation catalyst 21 is poisoned by the polluted material such as the organic material and the inorganic material included in the process discharge gas, such that activity of the oxidation catalyst 21 may be decreased. In this case, when the synthesis gas including the hydrogen and having the high temperature (for example, 350° C. or more), generated by the plasma reactor 40 and supplied to the front of the oxidation catalyst 21 is supplied to the oxidation catalyst 21, the oxidation catalyst 21 may be regenerated.

That is, the synthesis gas including the hydrogen and having the high temperature oxidizes and removes the combustible material in the oxidation catalyst 21, the inorganic material is volatilized or combines and reacts with the hydrogen on a catalyst surface, and the organic material and the inorganic material poisoning the oxidation catalyst 21 are thus removed.

After the oxidation catalyst 21 is regenerated, the process discharge gas discharged from the oxidation catalyst tower 20 is discharged to the rear while being maintained at a second temperature (for example, 255° C.) level higher than a first temperature (for example, 222° C.).

Figure 2:
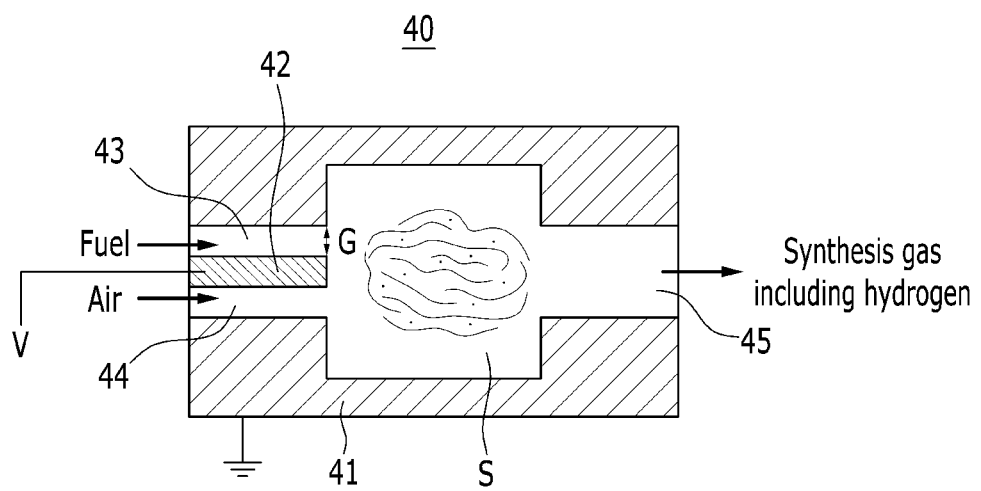
FIG. 2 is a cross-sectional view illustrating a plasma reactor applied to FIG. 1.

FIG. 2 is a cross-sectional view illustrating a plasma reactor applied to FIG. 1.

Referring to FIG. 2, a plasma reactor 40 includes a housing 41 electrically grounded and an electrode 42 embedded in the housing 41 and having a voltage V applied thereto.

The housing 41 includes a fuel supply port 43 and an air supply port 44 disposed at one side thereof, and includes a discharge port 45 disposed at the other side thereof. The fuel supply port 43 and the air supply port 44 supplies a fuel and an air, respectively, to an electric discharge gap G, and the discharge port 45 discharges a synthesis gas including hydrogen, generated by a plasma reaction.

The electrode 42 may be provided at an inlet side of the housing 41 to which the fuel and the air are supplied. As an example, the electrode 42 is disposed between the fuel supply port 43 and the air supply port 44. Therefore, when the voltage V is applied to the electrode 42 in a state in which the housing 41 is grounded, an arc is generated in the electric discharge gap G set between the electrode 42 and the housing 41 to generate a plasma reaction using the supplied fuel and air. In this case, the used fuel may be a hydrocarbon-based fuel including hydrogen, such as a liquefied natural gas (LNG).

The housing 41 includes a plasma reaction space S extended from the fuel supply port 43 and the air supply port 44 to the discharge port 45. Therefore, the arc generated in the electric discharge gap G set between the electrode 42 and the housing 41 generates a synthesis gas including hydrogen and having a high temperature while being diffused by the plasma reaction in the plasma reaction space S.

The plasma reaction space S expanded and formed in the housing 41 facilitates the plasma reaction, and allows the hydrogen and the synthesis gas having the high temperature to be discharged through the discharge port 45. The process discharge gas may be generated and be continuously supplied at a large flow rate through the pipe 10 in an industrial process.

Since the plasma reactor 40 generates the plasma reaction, which is a partial oxidation reaction, to generate the hydrogen, it may supply hydrogen to the oxidation catalyst 21 in the shortest time. A byproduct of the partial oxidation reaction is discharged in a high temperature state from the plasma reaction space S through the discharge port 45.

Therefore, the synthesis gas including hydrogen and having a temperature of 300 to 600° C. or more may be generated without performing a separate heating process and be then supplied to the oxidation catalyst 21. That is, plasma having an arc form may form a relatively high temperature condition in the plasma reaction space S within the plasma reactor 40.

The synthesis gas including hydrogen, generated in the plasma reactor 40 is supplied to the oxidation catalyst 21 of the oxidation catalyst tower 20. At the same time, the process discharge gas introduced into the pipe 10 and having the first temperature passes through the oxidation catalyst 21 and is then discharged.

Therefore, the oxidation catalyst 21 poisoned by the organic material and the inorganic material included in the process discharge gas is regenerated by exposure to a high temperature condition by the synthesis gas including the hydrogen and having the temperature of 300 to 600° C. or more. That is, the organic material and the inorganic material X of the poisoned oxidation catalyst 21 are volatilized at a high temperature to be thus removed from the catalyst surface or are combined with the hydrogen in a form of HnXm to be thus separated and removed from the oxidation catalyst 21.

After oxidation catalyst 21 is regenerated, the process discharge gas discharged from the oxidation catalyst tower 20 is heat to the second temperature level higher than the first temperature.

Figure 3:
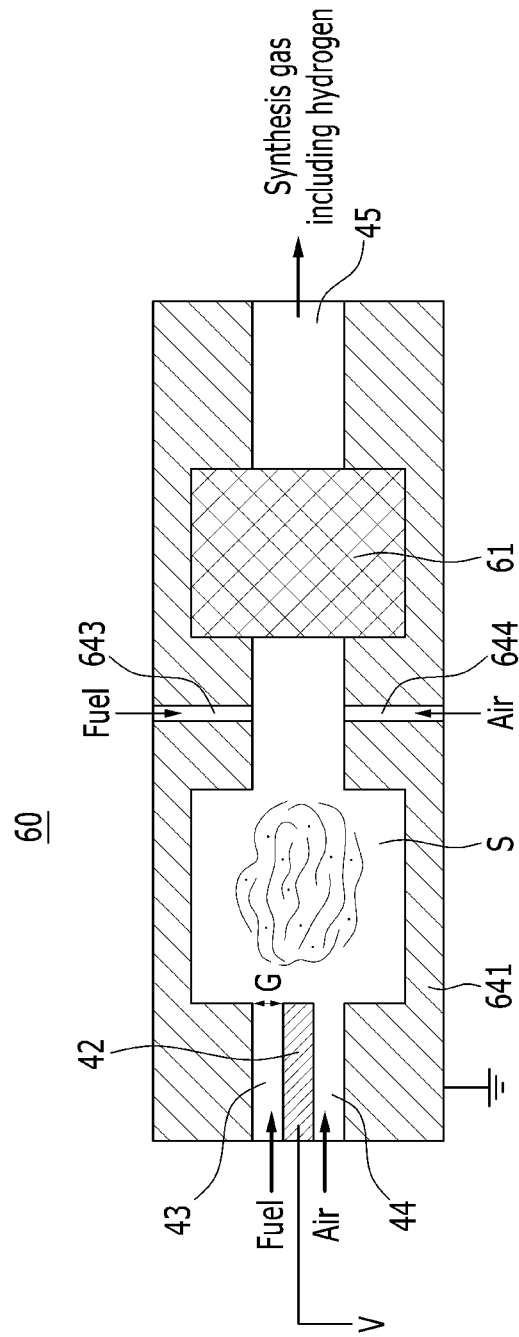
FIG. 3 is a cross-sectional view illustrating another plasma reactor applied to FIG. 1.

FIG. 3 is a cross-sectional view illustrating another plasma reactor applied to FIG. 1.

Referring to FIG. 3, a plasma reactor 60 may further include a reforming catalyst 61. That is, the reforming catalyst 61 communicates with a plasma reaction space S formed between a fuel supply port 43 and an air supply port 44, and a discharge port 45 of a housing 641.

In the case of using the reforming catalyst 61, a reforming reaction due to a catalyst may be additional caused to decrease electric power required for a plasma reaction. Therefore, energy applied as a voltage V to an electrode 42 in order to generate the hydrogen may be decreased, and a processing capacity for oxidizing and removing the polluted material included in the process discharge gas may be increased.

The plasma reactor 60 may further include a fuel additional supply port 643 and an air additional supply port 644 provided between the plasma reaction space S of the housing 641 and the reforming catalyst 61 to receive an additionally supplied fuel and air, thereby further extending plasma generated and discharged by the plasma reaction space S.

The further extended plasma may be supplied to the reforming catalyst 61 to further activate the reforming reaction of the reforming catalyst, thereby maximizing a reforming action of the reforming catalyst 61. That is, since the plasma reaction space S and the reforming catalyst 61 further facilitates the plasma reaction and large amounts of hydrogen and synthesis gas having a high temperature are discharged through a discharge port 45, the plasma reactor may be effectively applied to a large flow rate industrial process.

Figure 4:
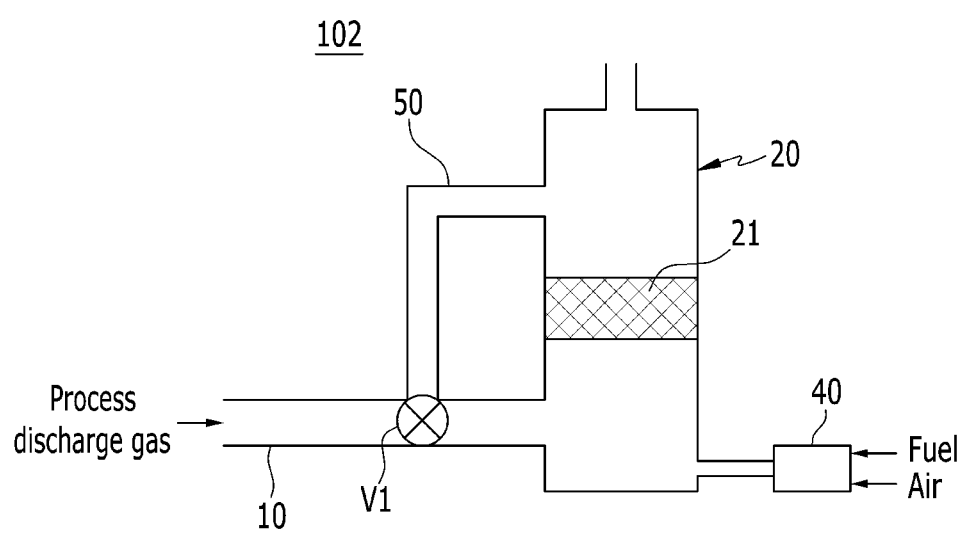
FIG. 4 is a configuration diagram illustrating a process discharge gas polluted material removal device with a regenerating means of a polluted oxidation catalyst according to a second exemplary embodiment of the present invention.

FIG. 4 is a configuration diagram illustrating a process discharge gas polluted material removal device with a regenerating means of a polluted oxidation catalyst according to a second exemplary embodiment of the present invention.

Referring to FIG. 4, a first control valve V1 of a process discharge gas polluted material removal device 102 with a regenerating means of a polluted oxidation catalyst is installed on a pipe 10 and selects a path of a process discharge gas introduced into the pipe 10 and supplied to an oxidation catalyst tower 20 in an industrial process, and having a first temperature.

That is, the first valve V1 is controlled so that the process discharge gas having the first temperature is supplied to an oxidation catalyst 21 or bypasses the oxidation catalyst 21. The first control valve V1 may allow the process discharge gas to bypass the oxidation catalyst 21 at the time of regenerating the oxidation catalyst 21.

To this end, the process discharge gas polluted material removal device 102 with a regenerating means of a polluted oxidation catalyst is provided with a bypass pipe 50. The bypass pipe 50 is connected to the pipe 10 in front of the oxidation catalyst 21 so that the process discharge gas bypasses the oxidation catalyst 21, and is connected to the oxidation catalyst tower 20 behind the oxidation catalyst 21. The first control valve V1 is installed on a connected portion between the pipe 10 and the bypass pipe 50, and selects a flow of the process discharge gas having the first temperature to the front or the rear of the oxidation catalyst 21.

A plasma reactor 40 is connected to the oxidation catalyst tower 20 behind the first valve V1 and in front of the oxidation catalyst 21. Therefore, when the first control valve V1 is controlled to allow the process discharge gas to be bypassed to the bypass pipe 50, the plasma reactor 40 generates a synthesis gas including hydrogen by a plasma reaction and supplies the synthesis gas including the hydrogen to the oxidation catalyst 21.

In this case, the bypass pipe 50 and the first control valve V1 allows the process discharge gas introduced into the pipe 10 and having the first temperature to be discharged without passing through the oxidation catalyst 21.

In the case in which a flow rate of the process discharge gas is large, the first control valve V1 is periodically switched to selectively connect the pipe 10 to the front and the rear of the oxidation catalyst 21. In addition, the plasma reactor 40 is periodically driven to periodically supply hydrogen and a synthesis gas including hydrogen to the oxidation catalyst 21. Therefore, the poisoned oxidation catalyst 21 may be periodically regenerated.

Figure 5:
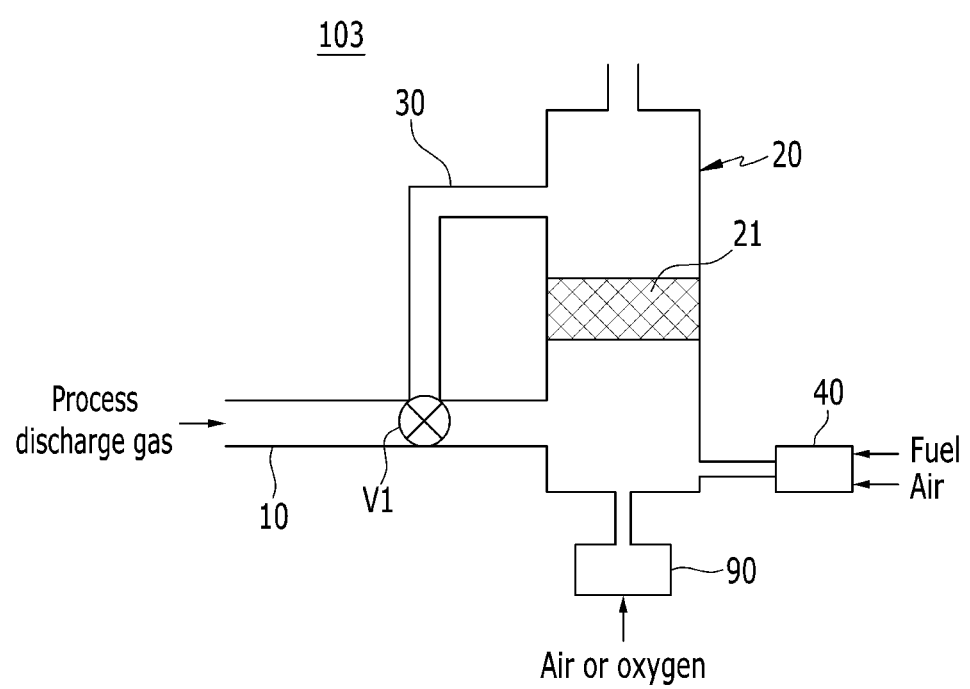
FIG. 5 is a configuration diagram illustrating a process discharge gas polluted material removal device with a regenerating means of a polluted oxidation catalyst according to a third exemplary embodiment of the present invention.

FIG. 5 is a configuration diagram illustrating a process discharge gas polluted material removal device with a regenerating means of a polluted oxidation catalyst according to a third exemplary embodiment of the present invention.

Referring to FIG. 5, a process discharge gas polluted material removal device 103 with a regenerating means of a polluted oxidation catalyst includes an ozone generator 90 supplying ozone to the front of the oxidation catalyst 21. Hereinafter, a description for the same components is omitted, and characteristic features are described.

The ozone generator 90 is connected to the oxidation catalyst tower 20, and supplies generated ozone to the front of the oxidation catalyst 21. The plasma reactor 40 and the ozone generator 90 may be driven in different times, respectively, to generate hydrogen and ozone, respectively, and supply the generated hydrogen and ozone to the oxidation catalyst 21.

The ozone generator 90 is configured to generate ozone from air or oxygen supplied to one side thereof. Ozone may oxidize and remove the organic material from the poisoned oxidation catalyst 21.

Figure 6:
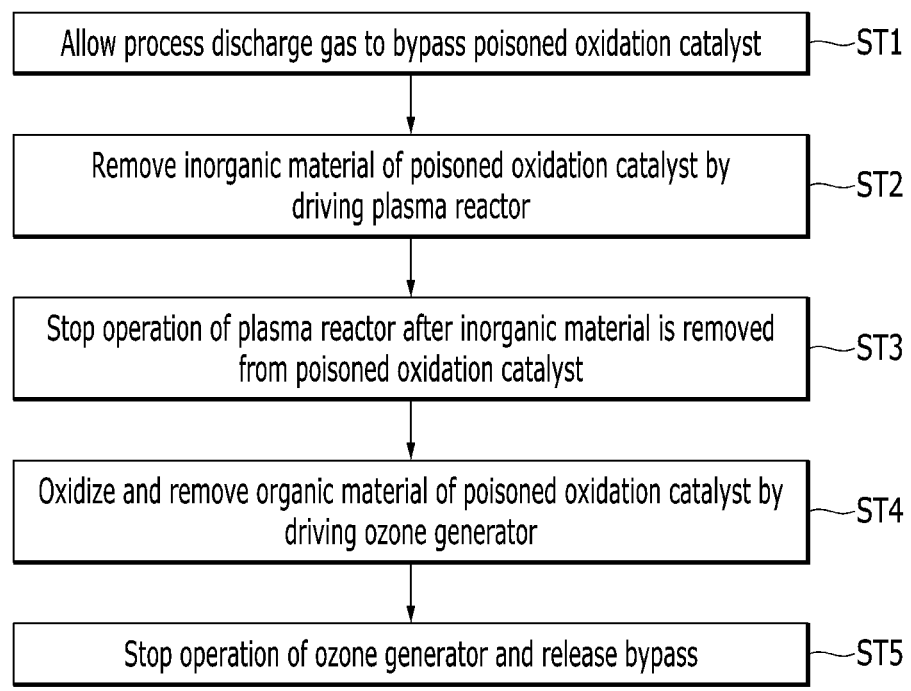
FIG. 6 is a flowchart illustrating a process discharge gas polluted material removal method with a regenerating means of a polluted oxidation catalyst according to a third exemplary embodiment of the present invention illustrated in FIG. 5.
Figure 7:
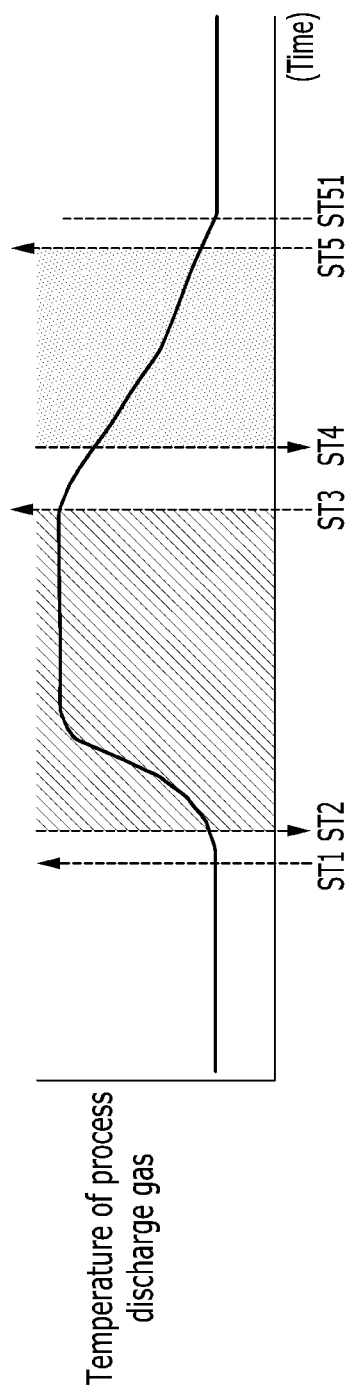
FIG. 7 is a time chart illustrating operation stop of a plasma reactor and an ozone generator according to the flowchart of FIG. 6.

FIG. 6 is a flowchart illustrating a process discharge gas polluted material removal method with a regenerating means of a polluted oxidation catalyst according to a third exemplary embodiment of the present invention illustrated in FIG. 5, and FIG. 7 is a time chart illustrating operation stop of a plasma reactor and an ozone generator according to the flowchart of FIG. 6.

Referring to FIGS. 6 and 5, a process discharge gas polluted material removal method with a regenerating means of a polluted oxidation catalyst includes a first step ST1, a second step ST2, a third step ST3, a fourth step ST4 and a fifth step ST5. Hereinafter, a process discharge gas polluted material removal method will be described with reference to a third exemplary embodiment.

In the first step ST1, in order to regenerate the poisoned oxidation catalyst 21, the process discharge gas is blocked to bypass the oxidation catalyst 21. In this case, the process discharge gas bypasses the oxidation catalyst 21 through the pipe 10, the first control valve V1 and the bypass pipe 50, and is then discharged to the oxidation catalyst tower 20.

In the second step ST2, when a predetermined time elapses after the process discharge gas is blocked, hydrogen generated by driving the plasma reactor 40 is supplied to the oxidation catalyst 21 to remove the inorganic material of the poisoned oxidation catalyst 21.

The hydrogen and the synthesis gas generated in a state in which the process discharge gas is blocked are supplied to the oxidation catalyst 21 to remove the inorganic material, thereby regenerating the oxidation catalyst 21.

When a high temperature condition is formed in order to regenerate the oxidation catalyst 21 poisoned by the inorganic material in a condition in which a temperature of the process discharge gas is lower than a set value (350° C.), excessive energy may be consumed in order to increase the temperature of the process discharge gas.

In the present exemplary embodiment, the process discharge gas is bypassed to the bypass pipe 50, and the hydrogen and the synthesis gas are supplied to the oxidation catalyst 21. Therefore, the temperature of the process discharge gas may be increased by very small flow rates of hydrogen and synthesis gas and energy to regenerate the oxidation catalyst 21. That is, the plasma reactor 40 supplies a hydrogen reforming gas having a high temperature to the oxidation catalyst 21.

In the third step ST3, when a predetermined time elapses after the plasma reactor 40 is driven, an operation of the plasma reactor 40 is stopped to block the supply of the hydrogen.

In the fourth step ST4, when a predetermined time elapses after the supply of the hydrogen is blocked, the ozone generated by driving the ozone generator 90 is supplied to the poisoned oxidation catalyst 21 to remove the organic material of the poisoned oxidation catalyst 21. In this case, the process discharge gas is cooled to a temperature lower than that when the plasma reactor 40 is operated to supply the hydrogen. The ozone generated in a state in which the hydrogen and the synthesis gas are blocked is supplied to the oxidation catalyst 21 to oxidize and remove the organic material, thereby regenerating the oxidation catalyst 21.

In the fifth step ST5, when a predetermined time elapses after the ozone generator 90 is driven, an operation of the ozone generator 90 is stopped to block the supply of the ozone, and the bypass for the oxidation catalyst 21 is released to introduce the process discharge gas into the oxidation catalyst 21 (ST51). When the supply of the ozone is blocked and the process discharge gas is supplied to the oxidation catalyst 21, the oxidation catalyst 21 removes the polluted material such as CO, the organic material, and the inorganic material included in the process discharge gas.

Figure 8:
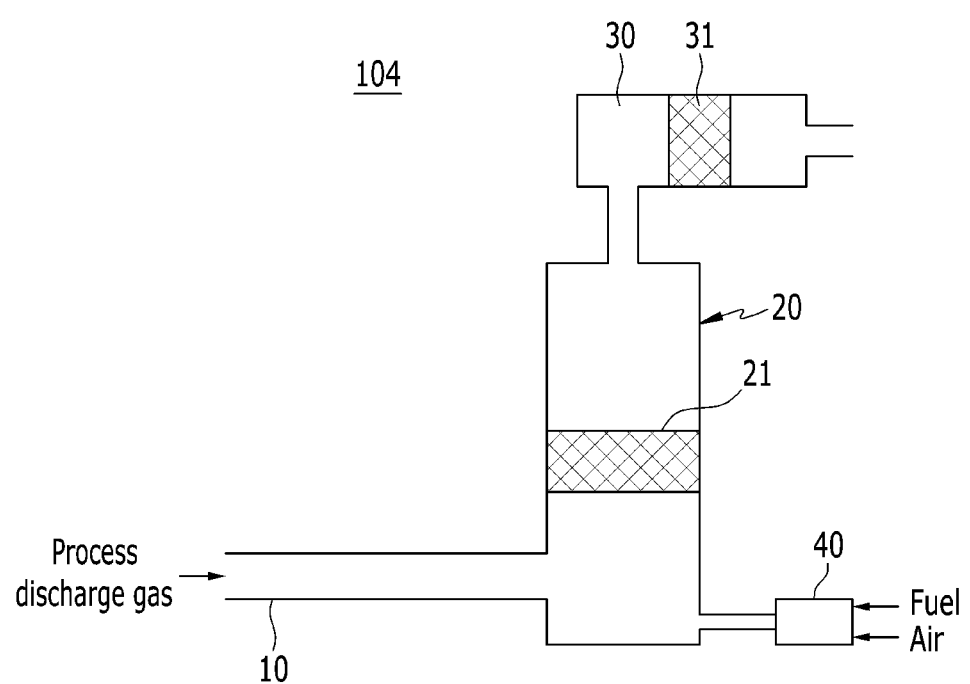
FIG. 8 is a configuration diagram illustrating a process discharge gas polluted material removal device with a regenerating means of a polluted oxidation catalyst according to a fourth exemplary embodiment of the present invention.

FIG. 8 is a configuration diagram illustrating a process discharge gas polluted material removal device with a regenerating means of a polluted oxidation catalyst according to a fourth exemplary embodiment of the present invention.

Referring to FIG. 8, a process discharge gas polluted material removal device 104 with a regenerating means of a polluted oxidation catalyst further includes a reduction catalyst tower 30 connected to the oxidation catalyst tower 20 and having a selective catalytic reduction (SCR) 31 embedded therein.

After the oxidation catalyst 21 is regenerated, the process discharge gas discharged from the oxidation catalyst tower 20 is maintained at a second temperature (for example, 255° C.) level higher than a first temperature (for example, 222° C.). Therefore, the selective catalytic reduction 31 may have a temperature increased up to a startup temperature by the process discharge gas heated and supplied and having the second temperature after the oxidation catalyst 21 is regenerated.

The selective catalytic reduction 31 is embedded in the reduction catalyst tower 30, has the temperature increased up to the startup temperature by the process discharge gas introduced into the front of the selective catalytic reduction 31 and having the second temperature, and reduces and removes NOx included in the process discharge gas having the second temperature level.

Therefore, the selective catalytic reduction 31 may effectively remove NOx included in the process discharge gas having the second temperature without using a separate heating means.

The selective catalytic reduction 31 has the temperature increased up to the startup temperature by the process discharge gas introduced into the front thereof and having the second temperature, and effectively reduces and removes NOx included in the process discharge gas without using the separate heating means.

For example, the process discharge gas polluted material removal device 104 with a regenerating means of a polluted oxidation catalyst may enable a temperature increase of about 9° C. in the process discharge gas per 1000 ppm of CO through an oxidation reaction in the oxidation catalyst 21. Even in the case in which a flow rate of the process discharge gas is large, the process discharge gas polluted material removal device 104 with a regenerating means of a polluted oxidation catalyst does not heat the entirety of the process discharge gas, but heats a portion of the process discharge gas, and thus, does not require a large amount of energy and a large equipment such as a large burner.

Figure 9:
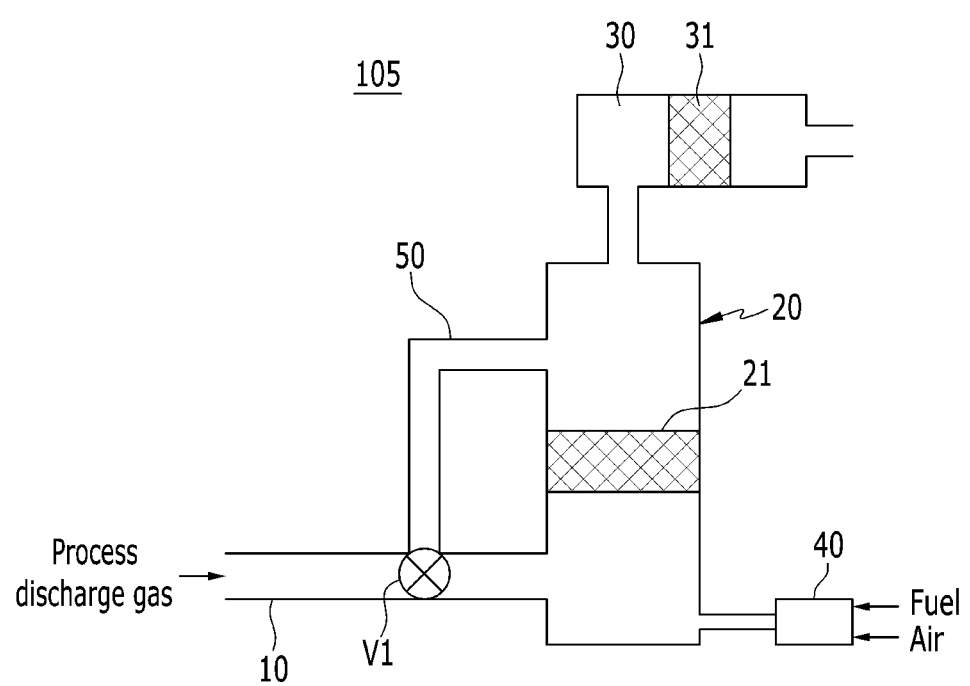
FIG. 9 is a configuration diagram illustrating a process discharge gas polluted material removal device with a regenerating means of a polluted oxidation catalyst according to a fifth exemplary embodiment of the present invention.

FIG. 9 is a configuration diagram illustrating a process discharge gas polluted material removal device with a regenerating means of a polluted oxidation catalyst according to a fifth exemplary embodiment of the present invention.

Referring to FIG. 9, a process discharge gas polluted material removal device 105 with a regenerating means of a polluted oxidation catalyst further includes a first control valve V1 and a bypass pipe 50.

The process discharge gas polluted material removal device with a regenerating means of a polluted oxidation catalyst includes a pipe 10 circulating a process discharge gas, an oxidation catalyst tower 20 connected to the pipe 10 and having an oxidation catalyst 21 embedded therein, a reduction catalyst tower 30 connected to the oxidation catalyst tower 20 and having a selective catalytic reduction (SCR) embedded therein, a first control valve V1 selecting a path of the process discharge gas, and a plasma reactor 40 generating a synthesis gas including hydrogen and having a high temperature.

The process discharge gas introduced into the pipe 10 in a production process is maintained at a first temperature level set depending on a process. After a combustible material included in the process discharge gas introduced into the front of the oxidation catalyst 21 is removed through an oxidation catalyst action, the process discharge gas is discharged to the rear of the oxidation catalyst 21.

When the synthesis gas including the hydrogen and having the high temperature (for example, 350° C. or more), generated by the plasma reactor 40 and supplied to the front of the oxidation catalyst 21 is supplied to the oxidation catalyst 21, the oxidation catalyst 21 may be regenerated.

That is, the synthesis gas including the hydrogen and having the high temperature oxidizes and removes the combustible material in the oxidation catalyst 21, the inorganic material is volatilized or combines and reacts with the hydrogen on a catalyst surface, and the organic material and the inorganic material poisoning the oxidation catalyst 21 are thus removed.

After the oxidation catalyst 21 is regenerated, the process discharge gas discharged from the oxidation catalyst tower 20 is maintained at a second temperature (for example, 255° C.) level higher than a first temperature (for example, 222° C.). Therefore, the selective catalytic reduction 31 may have a temperature increased up to a startup temperature by the process discharge gas heated and supplied and having the second temperature after the oxidation catalyst 21 is regenerated.

The selective catalytic reduction 31 is embedded in the reduction catalyst tower 30, has the temperature increased up to the startup temperature by the process discharge gas introduced into the front of the selective catalytic reduction 31 and having the second temperature, and reduces and removes NOx included in the process discharge gas having the second temperature level. Therefore, the selective catalytic reduction 31 may effectively remove NOx included in the process discharge gas having the second temperature without using a separate heating means.

The first control valve V1 is installed on the pipe 10, and selects the path of the process discharge gas introduced into the pipe 10 and supplied to the oxidation catalyst tower 20 in an industrial process, and having a first temperature. That is, the first valve V1 is controlled so that the process discharge gas having the first temperature is supplied to the oxidation catalyst 21 or bypasses the oxidation catalyst 21. The first control valve V1 may allow the process discharge gas to bypass the oxidation catalyst 21 at the time of regenerating the oxidation catalyst 21.

The bypass pipe 50 is connected to the pipe 10 in front of the oxidation catalyst 21 so that the process discharge gas bypasses the oxidation catalyst 21, and is connected to the oxidation catalyst tower 20 behind the oxidation catalyst 21. The first control valve V1 is installed on a connected portion between the pipe 10 and the bypass pipe 50, and selects a flow of the process discharge gas having the first temperature to the front or the rear of the oxidation catalyst 21.

The plasma reactor 40 is connected to the oxidation catalyst tower 20 behind the first valve V1 and in front of the oxidation catalyst 21. Therefore, when the first control valve V1 is controlled to allow the process discharge gas to be bypassed to the bypass pipe 50, the plasma reactor 40 generates a synthesis gas including hydrogen by a plasma reaction and supplies the synthesis gas including the hydrogen to the oxidation catalyst 21.

Therefore, the oxidation catalyst 21 poisoned by the organic material and the inorganic material included in the process discharge gas is regenerated by exposure to a high temperature condition by the synthesis gas including the hydrogen and having the temperature of 300 to 600° C. or more. That is, the organic material and the inorganic material X of the poisoned oxidation catalyst 21 are volatilized at a high temperature to be thus removed from the catalyst surface or are combined with the hydrogen in a form of HnXm to be thus separated and removed from the oxidation catalyst 21.

In the case in which a flow rate of the process discharge gas is large, the first control valve V1 is periodically switched to selectively connect the pipe 10 to the front and the rear of the oxidation catalyst 21. In addition, the plasma reactor 40 is periodically driven to periodically supply hydrogen and a synthesis gas including hydrogen to the oxidation catalyst 21. Therefore, the poisoned oxidation catalyst 21 may be periodically regenerated.

After the oxidation catalyst 21 is regenerated, the process discharge gas discharged from the oxidation catalyst tower 20 is heated to the second temperature level higher than the first temperature and is then supplied to the selective catalytic reduction 31 to increase the temperature of the selective catalytic reduction 31 to the startup temperature.

The selective catalytic reduction 31 has the temperature increased up to the startup temperature by the process discharge gas introduced into the front thereof and having the second temperature, and effectively reduces and removes NOx included in the process discharge gas without using the separate heating means.

For example, the process discharge gas polluted material removal device 105 with a regenerating means of a polluted oxidation catalyst may enable a temperature increase of about 9° C. in the process discharge gas per 1000 ppm of CO through an oxidation reaction in the oxidation catalyst 21. Even in the case in which a flow rate of the process discharge gas is large, the process discharge gas polluted material removal device 105 with a regenerating means of a polluted oxidation catalyst does not heat the entirety of the process discharge gas, but heats a portion of the process discharge gas, and thus, does not require a large amount of energy and a large equipment such as a large burner.

Figure 10:
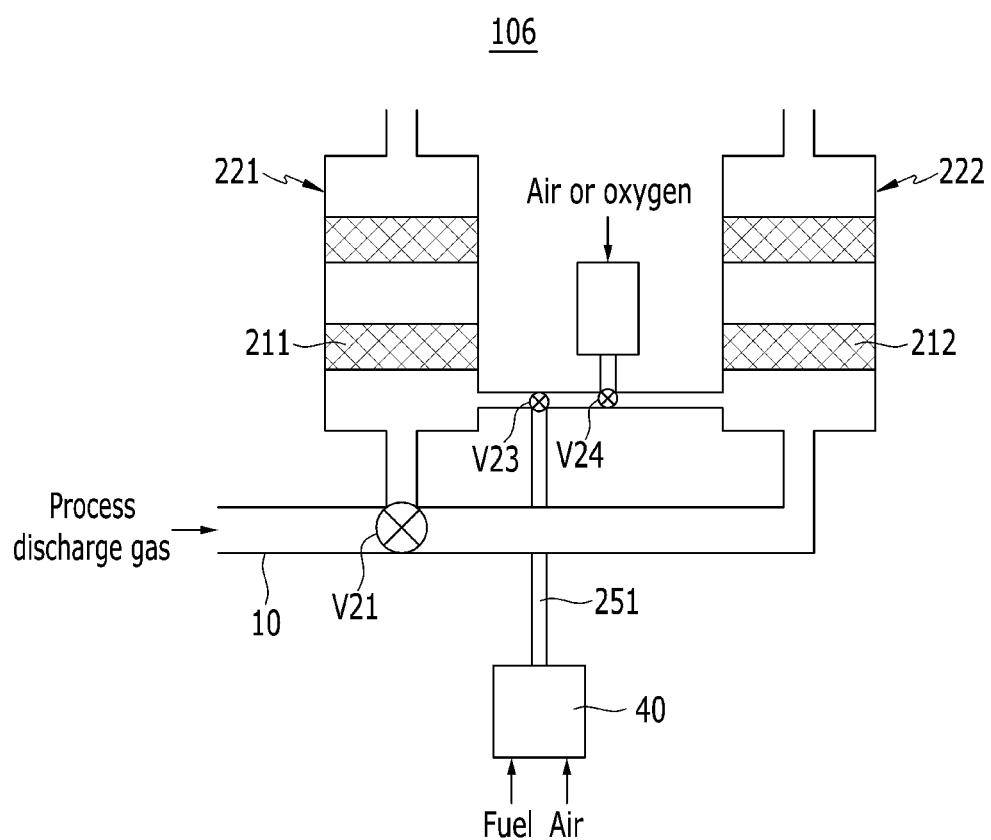
FIG. 10 is a configuration diagram illustrating a process discharge gas polluted material removal device with a regenerating means of a polluted oxidation catalyst according to a sixth exemplary embodiment of the present invention.

FIG. 10 is a configuration diagram illustrating a process discharge gas polluted material removal device with a regenerating means of a polluted oxidation catalyst according to a sixth exemplary embodiment of the present invention.

Referring to FIG. 10, a process discharge gas polluted material removal device 106 with a regenerating means of a polluted oxidation catalyst includes a pipe 10, a first oxidation catalyst tower 221 and a second oxidation catalyst tower 222 connected to the pipe 10 through a first control valve V21, a plasma reactor 40, and an ozone generator 90.

The first oxidation catalyst tower 221 has a first oxidation catalyst 221 embedded therein, and the second oxidation catalyst tower 222 has a second oxidation catalyst 212 embedded therein. The first and second oxidation catalysts 211 and 212 may be formed and disposed in one stage or plural stages within the first and second oxidation catalyst towers 221 and 222, respectively.

Since the first and second oxidation catalyst towers 221 and 222 are connected to the pipe 10 through the first control valve V21, they may receive a process discharge gas selectively supplied depending on an operation of the first control valve V21. That is, the first control valve V21 provided in the pipe 10 selects whether to supply the process discharge gas to the first oxidation catalyst tower 221 or the second oxidation catalyst tower 222.

The plasma reactor 40 and the ozone generator 90 may be connected to the first and second oxidation catalyst towers 221 and 222 to selectively hydrogen and ozone to the fronts of the first and second oxidation catalysts 211 and 212. To this end, a supply pipe 450 is connected to the first and second oxidation catalyst towers 221 and 222, and is connected to the plasma reactor 40 and the ozone generator 90 to selectively supply the hydrogen, a synthesis gas, and the ozone.

A third control valve V23 is interposed in the supply pipe 450 and is connected to the plasma reactor 40, and a fourth control valve V24 is interposed in the supply pipe 450 and is connected to the ozone generator 90.

That is, the plasma reactor 40 is selectively connected to the first and second catalyst towers 221 and 222 through the third control valve V23 and the supply pipe 450, and the ozone generator 90 is selectively connected to the first and second catalyst towers 221 and 222 through the fourth control valve V24.

For example, in the case in which the second oxidation catalyst 212 is poisoned, the first control valve V21 supplies the process discharge gas to the first oxidation catalyst tower 221 to allow the process discharge gas to bypass the second oxidation catalyst 212, and the third control valve V23 supplies the hydrogen and the synthesis gas to the second oxidation catalyst tower 222 through the supply pipe 450 to remove an inorganic material from the poisoned second oxidation catalyst 212, thereby regenerating the second oxidation catalyst 212. In this case, a polluted material included in the process discharge gas is removed in the first oxidation catalyst 211 of the first oxidation catalyst tower 221.

In addition, after the inorganic material is removed from the poisoned second oxidation catalyst 212 in a higher temperature condition, driving of the plasma reactor 40 is stopped, and the ozone generator 90 is driven at a temperature lower than a temperature at which the inorganic material is removed.

In this state, a large amount of ozone generated by the ozone generator 90 is supplied to the second oxidation catalyst 212 within the second oxidation catalyst tower 222, such that an organic material is oxidized and removed by the ozone from the poisoned second oxidation catalyst 212.

That is, the plasma reactor 40 and the ozone generator 90 are periodically driven with respect to the second oxidation catalyst 212 to periodically supply the hydrogen and the ozone to the second oxidation catalyst 212, respectively. Therefore, the second oxidation catalyst 212 may be periodically regenerated from the inorganic material and the organic material when the polluted material is not removed.

In addition, in the case in which the second oxidation catalyst 211 is poisoned, the first control valve V21 supplies the process discharge gas to the second oxidation catalyst tower 222 to allow the process discharge gas to bypass the first oxidation catalyst 211, and the third control valve V23 supplies the hydrogen and the synthesis gas to the first oxidation catalyst tower 221 to remove an inorganic material from the poisoned first oxidation catalyst 211, thereby regenerating the first oxidation catalyst 211. In this case, a polluted material included in the process discharge gas is removed in the second oxidation catalyst 212 of the second oxidation catalyst tower 222.

In addition, after the inorganic material is removed from the poisoned first oxidation catalyst 211 in a higher temperature condition, driving of the plasma reactor 40 is stopped, and the ozone generator 90 is driven at a temperature lower than a temperature at which the inorganic material is removed.

In this state, a large amount of ozone generated by the ozone generator 90 is supplied to the first oxidation catalyst 211 within the first oxidation catalyst tower 221, such that an organic material is oxidized and removed by the ozone from the poisoned first oxidation catalyst 211.

That is, the plasma reactor 40 and the ozone generator 90 are periodically driven with respect to the first oxidation catalyst 211 to periodically supply the hydrogen and the ozone to the first oxidation catalyst 211, respectively. Therefore, the first oxidation catalyst 211 may be periodically regenerated from the inorganic material and the organic material when the polluted material is not removed.

Therefore, the process discharge gas may be continuously oxidized and removed through the first or second oxidation catalyst 211 or 212 of the first or second oxidation catalyst tower 221 or 222 while the second or first oxidation catalyst 212 or 211 being regenerated.

Figure 11:
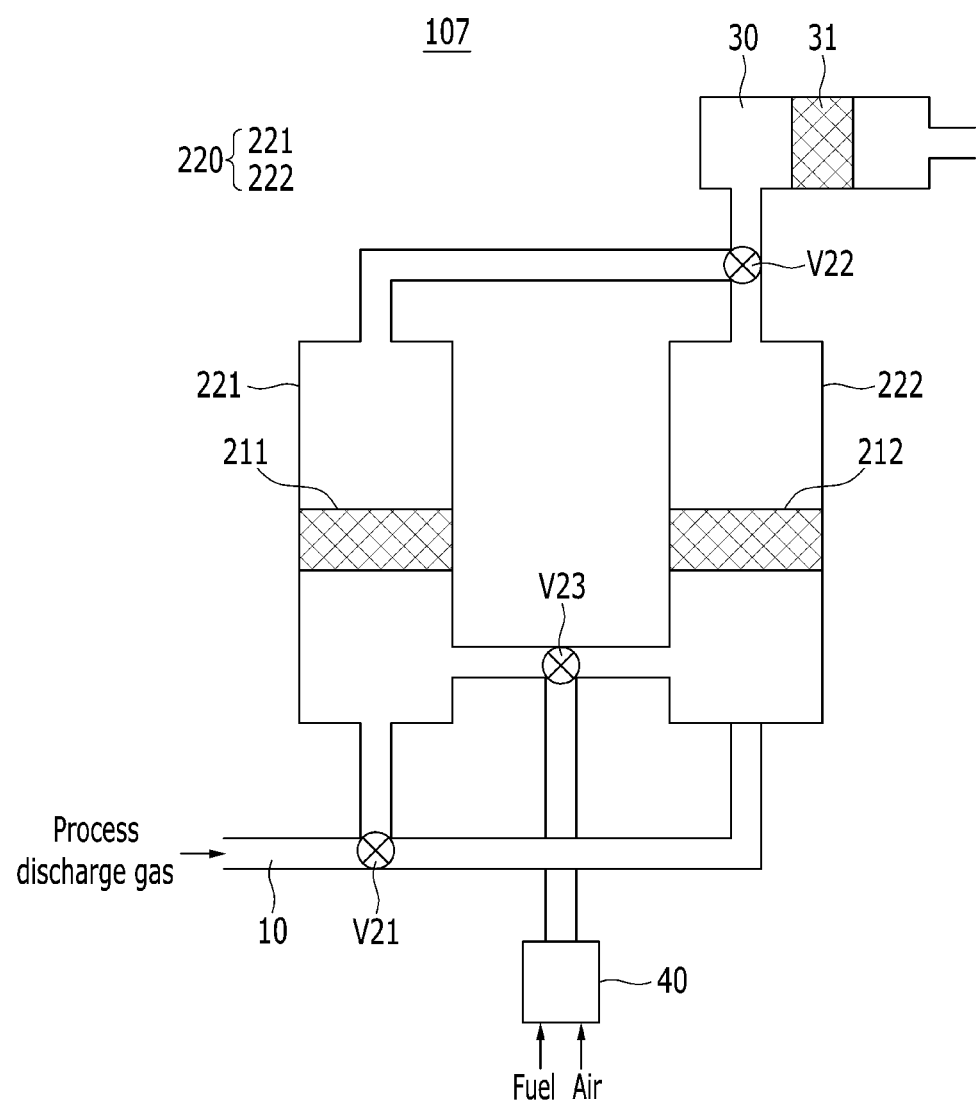
FIG. 11 is a configuration diagram illustrating a process discharge gas polluted material removal device with a regenerating means of a polluted oxidation catalyst according to a modified example of a seventh exemplary embodiment of the present invention.

FIG. 11 is a configuration diagram illustrating a process discharge gas polluted material removal device with a regenerating means of a polluted oxidation catalyst according to a modified example of a seventh exemplary embodiment of the present invention.

Referring to FIG. 11, in a process discharge gas polluted material removal device 107 with a regenerating means of a polluted oxidation catalyst, an oxidation catalyst tower 220 includes a first oxidation catalyst tower 221 and a second oxidation catalyst tower 222. The first oxidation catalyst tower 221 and the second oxidation catalyst tower 222 may be disposed in parallel with each other, and may be selectively connected to a selective catalytic reduction 31 by a second control valve V22.

A first control valve V21 is disposed in front of the first and second oxidation catalysts 211 and 212, and selectively connect a pipe 10 to the first and second oxidation catalyst towers 221 and 222. Therefore, the process discharge gas passing through the pipe 10 and having a first temperature may be selectively supplied to the first and second oxidation catalysts 211 and 212 of the first and second oxidation catalyst towers 221 and 222 depending on a control of the first control valve V21.

The second control valve V22 is disposed behind the first and second oxidation catalysts 211 and 212, and selectively connects the first and second oxidation catalyst towers 221 and 222 to the selective catalytic reduction 31. Therefore, the process discharge gas passing through the first and second oxidation catalysts 211 and 212 of the first and second oxidation catalyst towers 221 and 222 and having a second temperature may be selectively supplied to the selective catalytic reduction 31 depending on a control of the second control valve V22.

A plasma reactor 40 is selectively connected to the first and second oxidation catalyst towers 221 and 222 through the selective catalytic reduction 31 behind the first control valve V21 and in front of the first and second oxidation catalysts 211 and 212. Therefore, a synthesis gas including hydrogen and having a high temperature, generated by the plasma reactor 40 may be selectively supplied to the first and second oxidation catalysts 211 and 212 of the first and second oxidation catalyst towers 221 and 222 depending on a control of a third control valve V23.

For example, in the case in which the second oxidation catalyst 212 is poisoned, the second oxidation catalyst 212 is regenerated, and the first oxidation catalyst 211 performs an oxidation catalyst action to increase a temperature of the process discharge gas while oxidizing and removing a combustible material. In this case, the selective catalytic reduction 31 removes NOx by a selective catalytic reduction reaction at the increased temperature.

That is, the first control valve V21 selectively connects the pipe 10 to the first oxidation catalyst tower 221, such that the process discharge gas having the first temperature is supplied to the first oxidation catalyst tower 221 and is oxidized in the first oxidation catalyst 211. The second control valve V22 connects the first oxidation catalyst tower 221 to a reduction catalyst tower 30, such that the process discharge gas supplied at the second temperature is supplied to the reduction catalyst tower 30 and is reduced in the selective catalytic reduction 31.

In addition, the third control valve V23 selectively connects the plasma reactor 40 to the poisoned second oxidation catalyst 212, such that the synthesis gas including the hydrogen is supplied to the second oxidation catalyst 212 to remove an organic material and an inorganic material poisoning the second oxidation catalyst 212.

In addition, in the case in which the first oxidation catalyst 211 is poisoned, the first oxidation catalyst 211 is regenerated, and the second oxidation catalyst 212 performs an oxidation catalyst action to increase a temperature of the process discharge gas while oxidizing and removing a combustible material. In this case, the selective catalytic reduction 31 removes NOx by a selective catalytic reduction reaction at the increased temperature.

That is, the first control valve V21 selectively connects the pipe 10 to the second oxidation catalyst tower 222, such that the process discharge gas having the first temperature is supplied to the second oxidation catalyst tower 222 and is oxidized in the second oxidation catalyst 212. The second control valve V22 connects the second oxidation catalyst tower 222 to the reduction catalyst tower 30, such that the process discharge gas supplied at the second temperature is supplied to the reduction catalyst tower 30 and is reduced in the selective catalytic reduction 31.

In addition, the third control valve V23 selectively connects the plasma reactor 40 to the poisoned first oxidation catalyst 211, such that the synthesis gas including the hydrogen is supplied to the first oxidation catalyst 211 to remove an organic material and an inorganic material poisoning the first oxidation catalyst 211.

Therefore, the process discharge gas polluted material removal device 107 with a regenerating means of a polluted oxidation catalyst may continuously remove the combustible material included in the process discharge gas having the first temperature through the first or second oxidation catalyst 211 or 212 of the first or second oxidation catalyst tower 221 or 222 while regenerating the second or first oxidation catalyst 212 or 211, and may remove NOx through the selective catalytic reduction 31 at a high temperature generated at the time of removing the combustible material.

In addition, after the first or second oxidation catalyst 211 or 212 is selectively regenerated, the process discharge gas discharged to the first and second oxidation catalyst towers 221 and 222 and having a second temperature level is supplied to the selective catalytic reduction 31 to increase a temperature of selective catalytic reduction 31 up to a startup temperature.

Therefore, the selective catalytic reduction 31 has the temperature sufficiently increased up to the startup temperature by the process discharge gas introduced into the front thereof and having the second temperature, and may effectively and sufficiently reduce and remove NOx included in the process discharge gas without using a separate heating means.

Even in the case in which a flow rate of the process discharge gas is large, the process discharge gas having the first temperature is not entirely heated, such that a large amount of energy and a large equipment such as a large burner are not required, and the process discharge gas is not discharged in a bypass manner.

Figure 12:
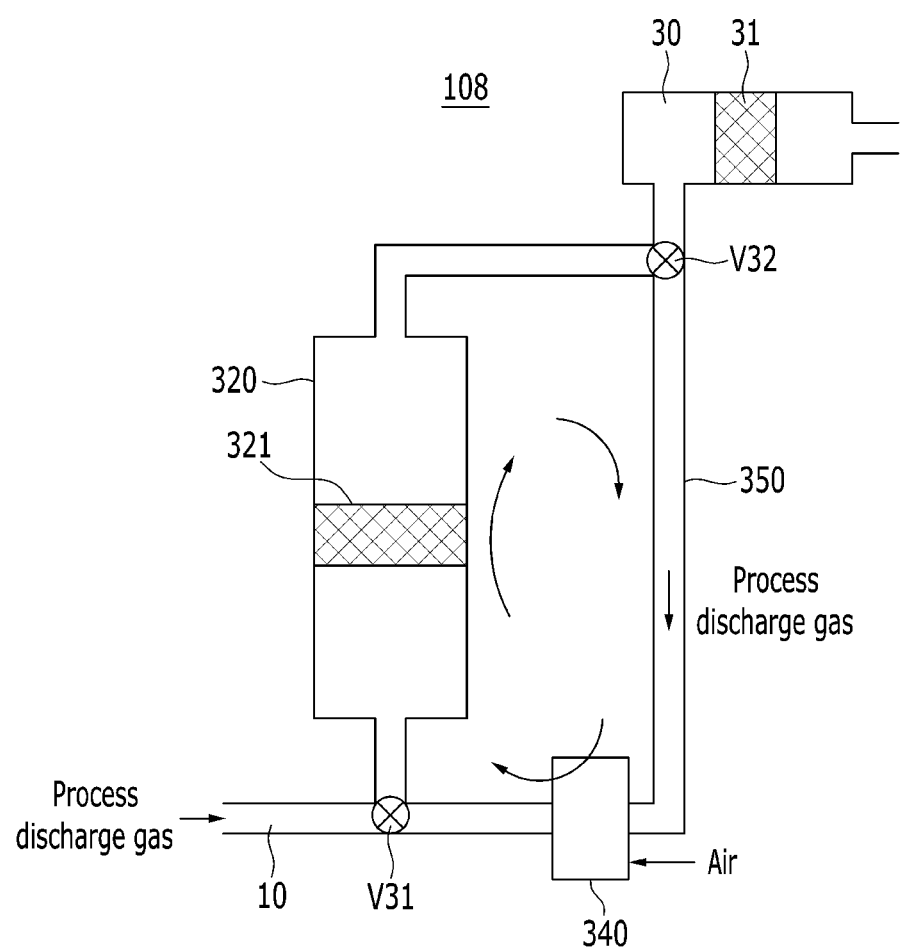
FIG. 12 is a configuration diagram illustrating a process discharge gas polluted material removal device with a regenerating means of a polluted oxidation catalyst according to an eighth exemplary embodiment of the present invention.
Figure 13:
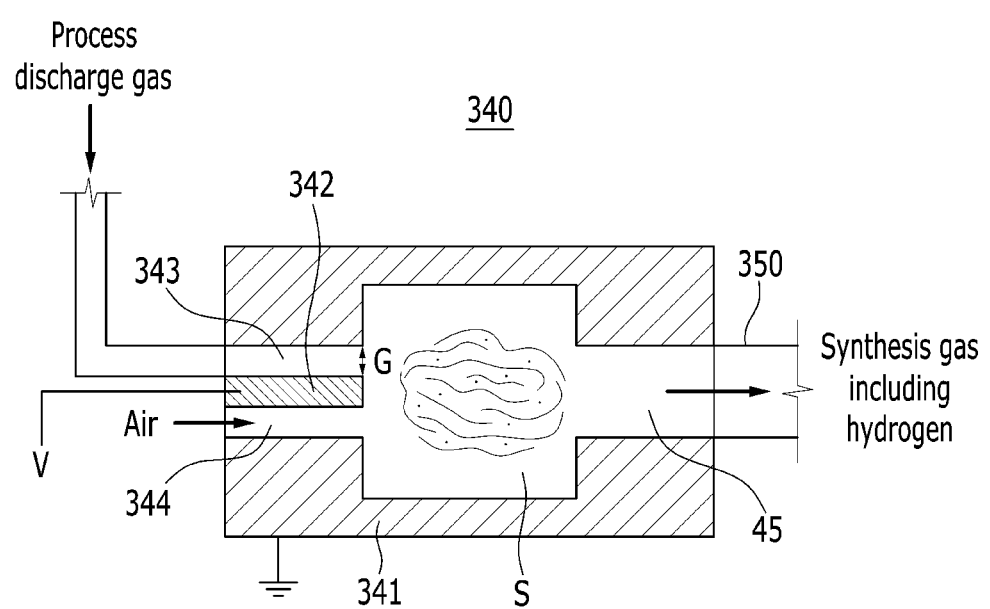
FIG. 13 is a cross-sectional view illustrating a plasma reactor applied to FIG. 12.

FIG. 12 is a configuration diagram illustrating a process discharge gas polluted material removal device with a regenerating means of a polluted oxidation catalyst according to an eighth exemplary embodiment of the present invention, and FIG. 13 is a cross-sectional view illustrating a plasma reactor applied to FIG. 12.

Referring to FIGS. 12 and 13, in a process discharge gas polluted material removal device 108 with a regenerating means of a polluted oxidation catalyst, an oxidation catalyst tower 320 is connected to a pipe 10, and a reduction catalyst tower 30 is provided behind and connected to the oxidation catalyst tower 320. A first control valve V31 is provided in front of the oxidation catalyst tower 320, and a second control valve V32 is provide behind the oxidation catalyst tower 320.

The first control valve V31 intermits a process discharge gas supplied from a pipe 10 to the oxidation catalyst tower 320 and having a first temperature, and the second control valve V32 intermits a process discharge gas supplied from the oxidation catalyst tower 320 to the reduction catalyst tower 30 and having a second temperature.

A bypass pipe 350 is connected to the pipe 10 through the first control valve V31 in front of an oxidation catalyst 321 and is connected to the oxidation catalyst tower 320 through the second control valve V32 behind the oxidation catalyst 321 so that the process discharge gas bypasses the oxidation catalyst tower 320. A plasma reactor 340 is installed on the bypass pipe 350.

Therefore, depending on selection controls of the first and second control valves V31 and V2, introduction and discharge of the process discharge gas are temporarily blocked at the first and second control valves V31 and V32, and the oxidation catalyst 321 and the plasma reactor 340 form a closed loop through the bypass pipe 350 and the first and second control valves V31 and V32. That is, the plasma reactor 340 generates a plasma reaction by process discharge gas circulated through the closed loop and having the first temperature and separately supplied air to generate and circulate a synthesis gas including hydrogen.

Since the plasma reactor 340 is driven by receiving the process discharge gas gradually heated from the first temperature to a high temperature rather than receiving separate fresh air, a fuel for increasing the temperature of the process discharge gas may be decreased. However, when the plasma reactor 340 is operated in the closed loop, it continuously receives and uses a gas combusted in advance, and a concentration of oxygen is thus gradually decreased.

Therefore, in the case in which the plasma reactor is operated in the closed loop using a general burner, an operable range becomes very narrow. However, even in the case in which the plasma reactor 340 is operated in the closed loop, a frame may be maintained even when a concentration of oxygen in the gas introduced into the plasma reactor 340 is about 10 to 100% of a combustion equivalent ratio.

Therefore, since the plasma reactor 340 is operated to sufficiently generate the synthesis gas including the hydrogen and supplies the synthesis gas including the hydrogen to the oxidation catalyst 321 to circulate the synthesis gas including the hydrogen, a combustible material may be removed by an oxidation catalyst action in the oxidation catalyst 321, catalyst poisoning occurring on the oxidation catalyst 321 may be solved, and NOx may be sufficiently removed in the selective catalytic reduction 31.

To this end, a process discharge gas supply port 343 provided at one side of a housing 341 in the plasma reactor 340 is connected to the bypass pipe 350 to supply the process discharge gas passing through the second control valve V32 and gradually heated from the first temperature to the high temperature into the housing 341.

The housing 341 that is grounded and an electrode 342 to which a voltage is applied generate an arc therebetween, and generate a plasma reaction in a plasma reaction space S, by partially using the circulated process discharge gas and air (fresh air) supplied to an air supply port 344.

Therefore, a discharge port 345 provided at the other side of the housing 341 discharges a synthesis gas including hydrogen, generated by the plasma reaction in the plasma reaction space S, to the bypass pipe 350 to allow the synthesis gas including the hydrogen to pass through the first control valve V31 and be then supplied again to the oxidation catalyst 321.

The process discharge gas polluted material removal device 108 with a regenerating means of a polluted oxidation catalyst may remove NOx included in the process discharge gas continuously further heated from the first temperature through the oxidation catalyst 321 of the oxidation catalyst tower 320 by a selective reduction reaction in the selective catalytic reduction 31 while regenerating the oxidation catalyst 321 poisoned by an organic material and an inorganic material.

In addition, after the oxidation catalyst 321 is regenerated, the bypass pipe 350 is blocked, and the process discharge gas discharged from the oxidation catalyst tower 320 and having a second temperature is supplied to the selective catalytic reduction 31 to increase a temperature of the selective catalytic reduction 31 up to a startup temperature, by controls of the first and second control valves V31 and V32.

Therefore, the selective catalytic reduction 31 has the temperature sufficiently increased up to the startup temperature by the process discharge gas introduced into the front thereof and having the second temperature, and may effectively and sufficiently reduce and remove NOx included in the process discharge gas having the second temperature without using a separate heating means.

Figure 14:
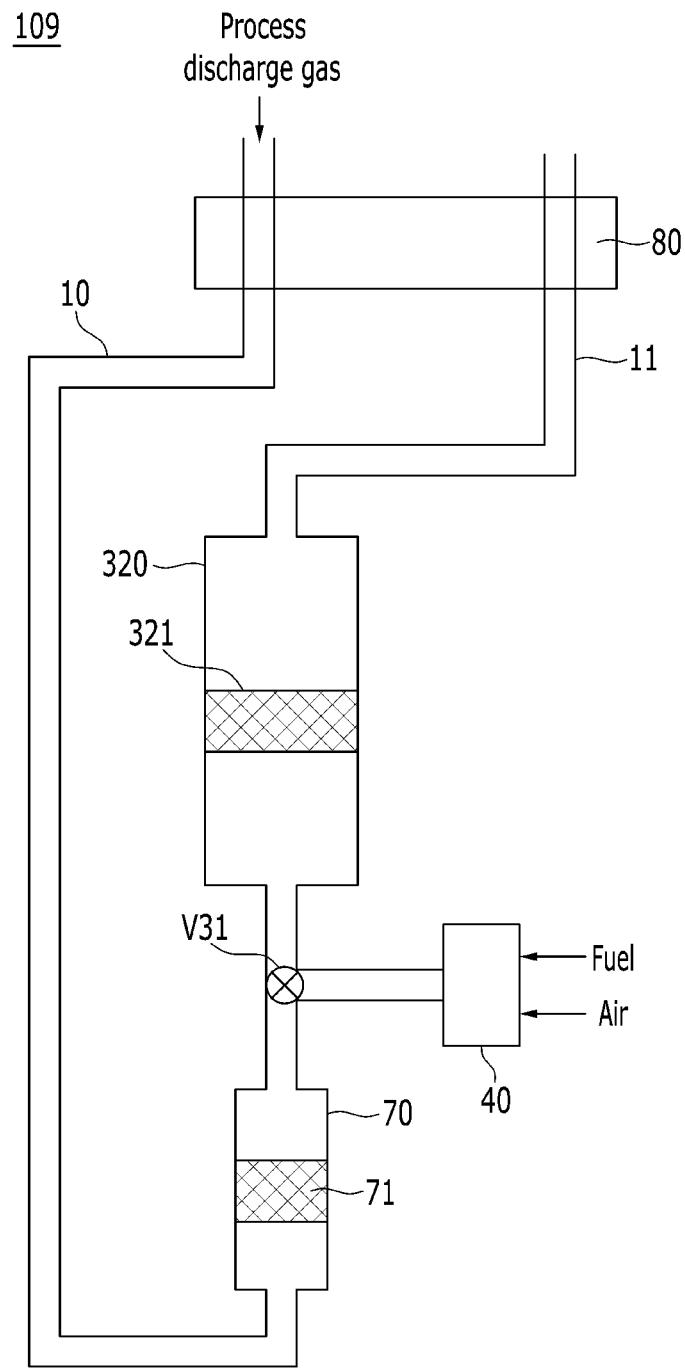
FIG. 14 is a configuration diagram illustrating a process discharge gas polluted material removal device with a regenerating means of a polluted oxidation catalyst according to a ninth exemplary embodiment of the present invention.

FIG. 14 is a configuration diagram illustrating a process discharge gas polluted material removal device with a regenerating means of a polluted oxidation catalyst according to a ninth exemplary embodiment of the present invention.

Referring to FIG. 14, in a process discharge gas polluted material removal device 109 with a regenerating means of a polluted oxidation catalyst, a reduction catalyst tower 70 having a selective catalytic reduction 71 embedded therein is provided in front of an oxidation catalyst tower 320, and is connected to a pipe 10.

A heat exchanger 80 is installed on a rear pipe 11 connected to the rear of the oxidation catalyst tower 320 and the pipe 10 connected to the front of the reduction catalyst tower 70. The heat exchanger 80 transfers heat of a process discharge gas heated in the oxidation catalyst tower 320 to have a second temperature to the pipe 10 to increase a temperature of a process discharge gas supplied to the pipe 10 and having a first temperature to a second temperature level.

A first control valve V31 intermits a process discharge gas supplied from the reduction catalyst tower 70 to the oxidation catalyst tower 320 through the pipe 10 and having the first temperature, and the rear pipe 11 supplies the process discharge gas having the second temperature from the oxidation catalyst tower 320 to the heat exchanger 80.

An oxidation catalyst 321 is connected to a plasma reactor 40 or the reduction catalyst tower 70 depending on a selection control of the first control valve V31. That is, the plasma reactor 40 generates a plasma reaction by a fuel and air to generate a synthesis gas including hydrogen, and supplies the synthesis gas including the hydrogen.

Since the synthesis gas including the hydrogen is sufficiently generated and passes through the oxidation catalyst 321, the oxidation catalyst 321 removes a combustible material by an oxidation catalyst action, and heats the process discharge gas to the second temperature level so as to sufficiently remove NOx from a selective catalytic reduction 31 while being regenerated.

The heated process discharge gas including the synthesis gas is discharged from the oxidation catalyst tower 320 to the rear pipe 11, and is heat-transferred to the pipe 10 through the heat exchanger 80. The process discharge gas supplied to the pipe 10 and having the first temperature has a temperature increased to the second temperature level by heat transferred from the heat exchanger 80.

The process discharge gas having the temperature increased to the second temperature level is supplied to the selective catalytic reduction 31 to increase a temperature of the selective catalytic reduction 31 to a startup temperature. Therefore, the selective catalytic reduction 31 may effectively and sufficiently reduce and remove NOx included in the process discharge gas having the second temperature without using a separate heating means.

Figure 15:
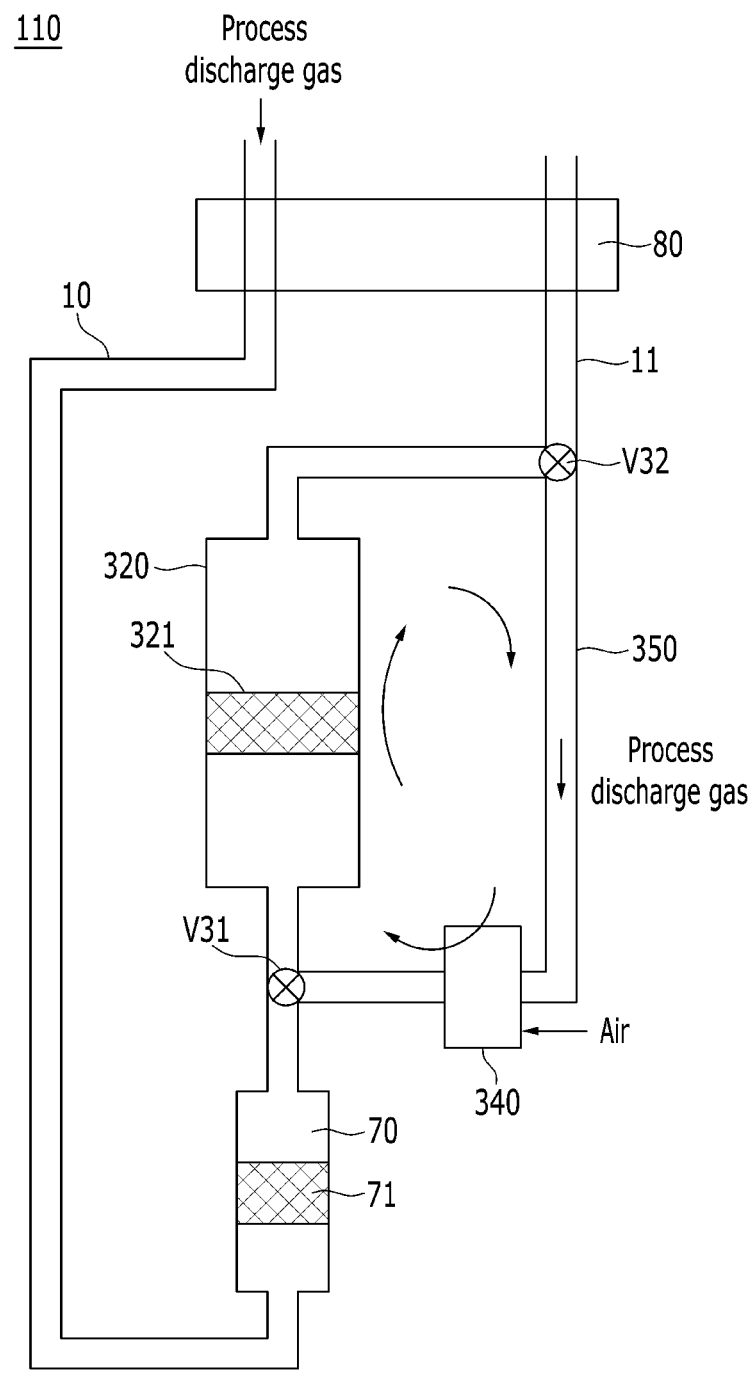
FIG. 15 is a configuration diagram illustrating a process discharge gas polluted material removal device with a regenerating means of a polluted oxidation catalyst according to a tenth exemplary embodiment of the present invention.

FIG. 15 is a configuration diagram illustrating a process discharge gas polluted material removal device with a regenerating means of a polluted oxidation catalyst according to a tenth exemplary embodiment of the present invention.

Referring to FIG. 15, in a process discharge gas polluted material removal device 110 with a regenerating means of a polluted oxidation catalyst, a first control valve V31 intermits a process discharge gas supplied from a reduction catalyst tower 70 to an oxidation catalyst tower 320 through a pipe 10 and having a first temperature, and a second control valve V32 intermits a process discharge gas supplied from the oxidation catalyst tower 320 to a rear pipe 11 and a heat exchanger 80 and having a second temperature.

An oxidation catalyst 321 and a plasma reactor 340 form a closed loop through a bypass pipe 350 depending on selection controls of the first and second control valves V31 and V32. That is, the plasma reactor 340 generates a plasma reaction by the process discharge gas circulated through the closed loop and having the first temperature and separately supplied air to generate and circulate a synthesis gas including hydrogen.

Since the synthesis gas including the hydrogen is sufficiently generated and is circulated through the oxidation catalyst 321, the oxidation catalyst 321 more rapidly removes a combustible material by an oxidation catalyst action, and heats the process discharge gas to a second temperature level so as to sufficiently remove NOx from a selective catalytic reduction 31 while being regenerated.

The heated process discharge gas including the synthesis gas is discharged from the oxidation catalyst tower 320 to the rear pipe 11, and is heat-transferred to the pipe 10 through the heat exchanger 80. The process discharge gas supplied to the pipe 10 and having the first temperature has a temperature increased to the second temperature level by heat transferred from the heat exchanger 80.

The process discharge gas having the temperature increased to the second temperature level is supplied to the selective catalytic reduction 31 to more rapidly increase a temperature of the selective catalytic reduction 31 to a startup temperature. Therefore, the selective catalytic reduction 31 may effectively and sufficiently reduce and remove NOx included in the process discharge gas having the second temperature without using a separate heating means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 101, 102, 103, 104, 105, 106, 107, 108, 109, 110: process discharge gas polluted material removal device with regenerating means of polluted oxidation catalyst | |
| 10, 11: pipe | |
| 20, 220, 320: oxidation catalyst tower | |
| 21, 321: oxidation catalyst | |
| 30, 70: reduction catalyst tower | 31, 71: selective catalytic reduction |
| 40, 60, 340: plasma reactor | 41, 341, 641: housing |
| 42, 342: electrode | 43: fuel supply port |
| 44, 344: air supply port | 45: discharge port |
| 50, 350: bypass pipe | 80: heat exchanger |
| 211, 212: first, second oxidation catalyst | |
| 221, 222: first, second oxidation catalyst tower | |
| 343: process discharge gas supply port | |
| 643: fuel additional supply port | |
| 644: air additional supply port | 90: ozone generator |
| 61: reforming catalyst | G: electric discharge gap |
| S: plasma reaction space | V: voltage |
| V1, V21, V31: first control valve | V22, V32: second control valve |
| V23: third control valve | V24: fourth control valve |

The invention claimed is:

1. A process discharge gas polluted material removal device with a regenerating means of a polluted oxidation catalyst, comprising:
an oxidation catalyst tower connected to a pipe circulating a process discharge gas including a combustible material, an organic material, an inorganic material X, and nitrogen oxide and having a first temperature and having an oxidation catalyst embedded therein, the oxidation catalyst oxidizing and removing the combustible material; and
a plasma reactor connected to the oxidation catalyst tower at a front of the oxidation catalyst, generating a synthesis gas including hydrogen and having a high temperature of 300° C. or more by a plasma reaction, and supplying the synthesis gas including the hydrogen to the oxidation catalyst to regenerate the oxidation catalyst poisoned by the organic material and the inorganic material X,
wherein the inorganic material X includes sulfur and a fluorine-based compound,
wherein the inorganic material X of the poisoned oxidation catalyst is combined with the hydrogen in a form of $H_nX_m$ to be separated and removed from the poisoned oxidation catalyst,
wherein the plasma reactor includes:
a housing including a fuel supply port and an air supply port disposed at one side thereof, including a discharge port disposed at the other side thereof, and grounded, the discharge port discharging the synthesis gas including the hydrogen; and
an electrode provided between the fuel supply port and the air supply port and having a voltage applied thereto,
wherein the housing includes a plasma reaction space extended between a front of the electrode and the discharge port.

2. The process discharge gas polluted material removal device with a regenerating means of a polluted oxidation catalyst of claim 1, further comprising:
a reduction catalyst tower connected to the oxidation catalyst tower and having a selective catalytic reduction embedded therein, the selective catalytic reduction removing the nitrogen oxide included in a process discharge gas having a second temperature higher than the first temperature.

3. The process discharge gas polluted material removal device with a regenerating means of a polluted oxidation catalyst of claim 2, further comprising:
a first control valve performing a selection so as to allow the process discharge gas having the first temperature to be supplied from the pipe to the oxidation catalyst or allow the process discharge gas having the first temperature to bypass the oxidation catalyst and be supplied to the reduction catalyst tower.

4. The process discharge gas polluted material removal device with a regenerating means of a polluted oxidation catalyst of claim 2 or claim 3, wherein:
the selective catalytic reduction
is heated to a startup temperature by the process discharge gas passing through the oxidation catalyst and having the second temperature.

5. The process discharge gas polluted material removal device with a regenerating means of a polluted oxidation catalyst of claim 1, wherein:
the plasma reactor
further includes a reforming catalyst communicating with a plasma reaction space formed between the fuel supply port and the air supply port, and the discharge port of the housing.

6. The process discharge gas polluted material removal device with a regenerating means of a polluted oxidation catalyst of claim 5, wherein:
the plasma reactor
includes a fuel additional supply port and an air additional supply port provided between the plasma reaction space of the housing and the reforming catalyst to additionally supply a fuel and air.

7. The process discharge gas polluted material removal device with a regenerating means of a polluted oxidation catalyst of claim 3, further comprising:

a bypass pipe connecting the first control valve to the oxidation catalyst tower so that the process discharge gas bypasses the oxidation catalyst.

8. The process discharge gas polluted material removal device with a regenerating means of a polluted oxidation catalyst of claim 3, wherein:
the oxidation catalyst tower
includes a first oxidation catalyst tower and a second oxidation catalyst tower disposed in parallel with each other and selectively connected to the selective catalytic reduction by a second control valve, and
the first control valve
selectively connects the pipe to the first oxidation catalyst tower and the second oxidation catalyst tower in front of the oxidation catalyst.

9. The process discharge gas polluted material removal device with a regenerating means of a polluted oxidation catalyst of claim 8, wherein:
the plasma reactor
is selectively connected to the first oxidation catalyst tower and the second oxidation catalyst tower through a third control valve.

10. The process discharge gas polluted material removal device with a regenerating means of a polluted oxidation catalyst of claim 2, further comprising:
a first control valve provided in front of the oxidation catalyst tower and intermitting the process discharge gas supplied to the oxidation catalyst tower and having the first temperature; and
a second control valve provided behind the oxidation catalyst tower and intermitting the process discharge gas supplied to the oxidation catalyst tower and having the second temperature.

11. The process discharge gas polluted material removal device with a regenerating means of a polluted oxidation catalyst of claim 10, wherein:
the plasma reactor
is installed on a bypass pipe connecting the first control valve and the second control valve to each other and generates a plasma reaction by the process discharge gas circulated through a closed loop formed by selection operations of the first control valve and the second control valve and having the first temperature and separately supplied air to generate the synthesis gas including the hydrogen and having the high temperature of 300° C. or more.

12. The process discharge gas polluted material removal device with a regenerating means of a polluted oxidation catalyst of claim 1, further comprising:
an ozone generator connected to the oxidation catalyst tower in front of the oxidation catalyst and supplying ozone.

13. The process discharge gas polluted material removal device with a regenerating means of a polluted oxidation catalyst of claim 12, further comprising:
a bypass pipe having one side connected to the oxidation catalyst tower behind the oxidation catalyst and the other side connected to the pipe through a first control valve so that the process discharge gas bypasses the oxidation catalyst.

14. The process discharge gas polluted material removal device with a regenerating means of a polluted oxidation catalyst of claim 13, wherein:
the oxidation catalyst tower
includes a first oxidation catalyst tower and a second oxidation catalyst tower disposed in parallel with each other and selectively connected to the selective catalytic reduction by a second control valve, and
the first control valve
selectively connects the pipe to the first oxidation catalyst tower and the second oxidation catalyst tower in front of the oxidation catalyst.

15. The process discharge gas polluted material removal device with a regenerating means of a polluted oxidation catalyst of claim 14, wherein:
a supply pipe connected to the plasma reactor and the ozone generator to selectively supply the hydrogen and the ozone
selectively connects the plasma reactor to the first oxidation catalyst tower and the second oxidation catalyst tower through a third control valve, and
selectively connects the ozone generator to the first oxidation catalyst tower and the second oxidation catalyst tower through a fourth control valve.

16. The process discharge gas polluted material removal device with a regenerating means of a polluted oxidation catalyst of claim 14, wherein:
the first oxidation catalyst and the second oxidation catalyst
are formed in one stage or plural stages within the first oxidation catalyst tower and the second oxidation catalyst tower, respectively.

17. The process discharge gas polluted material removal device with a regenerating means of a polluted oxidation catalyst of claim 11, wherein:
air supplied to the plasma reactor
is set to 10 to 100% of a combustion equivalent ratio.

18. The process discharge gas polluted material removal device with a regenerating means of a polluted oxidation catalyst of claim 10, wherein:
the reduction catalyst tower
is provided behind the oxidation catalyst tower.

19. The process discharge gas polluted material removal device with a regenerating means of a polluted oxidation catalyst of claim 18, wherein:
the first control valve
intermits the process discharge gas supplied from the pipe to the oxidation catalyst tower and having the first temperature, and
the second control valve
intermits the process discharge gas supplied from the oxidation catalyst tower to the reduction catalyst tower and having the second temperature.

20. The process discharge gas polluted material removal device with a regenerating means of a polluted oxidation catalyst of claim 10, wherein:
the reduction catalyst tower is provided in front of the oxidation catalyst tower and is connected to the pipe, and
a heat exchanger is installed on the pipe and a rear pipe of the oxidation catalyst tower.

21. The process discharge gas polluted material removal device with a regenerating means of a polluted oxidation catalyst of claim 20, wherein:
the first control valve
intermits the process discharge gas supplied from the reduction catalyst tower to the oxidation catalyst tower and having the first temperature, and
the second control valve
intermits the process discharge gas supplied from the oxidation catalyst tower to the heat exchanger and having the second temperature.

22. A process discharge gas polluted material removal method with a regenerating means of a polluted oxidation catalyst, comprising:
- a first step of blocking a process discharge gas to allow the process discharge gas to bypass a poisoned oxidation catalyst, in order to regenerate the poisoned oxidation catalyst;
- a second step of supplying hydrogen generated by driving a plasma reactor to the poisoned oxidation catalyst to remove an inorganic material of the poisoned oxidation catalyst;
- a third step of blocking the supply of the hydrogen by stopping an operation of the plasma reactor when a predetermined time elapses after the plasma reactor is driven;
- a fourth step of supplying ozone generated by driving an ozone generator to the poisoned oxidation catalyst to remove an organic material of the poisoned oxidation catalyst; and
- a fifth step of blocking the supply of the ozone by stopping an operation of the ozone generator, releasing the bypass of the process discharge gas for the poisoned oxidation catalyst, and introducing the process discharge gas into the poisoned oxidation catalyst, when a predetermined time elapses after the ozone generator is driven.

23. The process discharge gas polluted material removal method with a regenerating means of a polluted oxidation catalyst of claim 22, wherein:
- in the first step,
- the oxidation catalyst poisoned by the inorganic material is regenerated in a condition in which a temperature of the process discharge gas is higher than a set value (350° C.).

24. The process discharge gas polluted material removal method with a regenerating means of a polluted oxidation catalyst of claim 22, wherein:
- the third step
- is performed at a temperature of the process discharge gas higher than a set value to remove the inorganic material, and
- the fourth step
- is performed at a temperature of the process discharge gas lower than the set value to oxidize and remove the organic material.

* * * * *